(12) United States Patent  
Kawamata

(10) Patent No.: US 7,933,265 B2  
(45) Date of Patent: Apr. 26, 2011

(54) TIME SWITCH

(75) Inventor: Mototsugu Kawamata, Kadoma (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 410 days.

(21) Appl. No.: 11/717,619

(22) Filed: Mar. 14, 2007

(65) Prior Publication Data

US 2007/0217404 A1    Sep. 20, 2007

(30) Foreign Application Priority Data

Mar. 16, 2006 (JP) ................................. 2006-073351

(51) Int. Cl.  
*H04L 12/50* (2006.01)

(52) U.S. Cl. ............ 370/360; 370/442; 370/537; 700/1; 700/14; 700/16

(58) Field of Classification Search .................... 700/14; 710/4

See application file for complete search history.

(56) References Cited

U.S. PATENT DOCUMENTS

| | | | | |
|---|---|---|---|---|
| 4,396,976 | A * | 8/1983 | Hyatt ................................ | 700/1 |
| 6,546,435 | B1 * | 4/2003 | Yoshimura et al. ............... | 710/4 |
| 6,658,303 | B2 * | 12/2003 | Hatemata et al. ............... | 700/14 |
| 6,888,472 | B2 * | 5/2005 | Yoshimura et al. ...... | 340/825.22 |
| 6,954,151 | B2 * | 10/2005 | Kawamata et al. ...... | 340/825.53 |
| 2002/0154652 | A1 * | 10/2002 | Yoshimura et al. .......... | 370/442 |
| 2003/0020630 | A1 * | 1/2003 | Kawamata et al. ...... | 340/825.53 |
| 2005/0119765 | A1 * | 6/2005 | Bergman et al. ................ | 700/16 |
| 2005/0259722 | A1 * | 11/2005 | Vanlonden et al. ........... | 375/145 |

FOREIGN PATENT DOCUMENTS

| | | |
|---|---|---|
| JP | 1998-145873 A | 5/1998 |
| JP | 2001-175306 A | 6/2001 |
| JP | 2002-16987 A | 1/2002 |
| JP | 2003-111154 A | 4/2003 |

OTHER PUBLICATIONS

JP Office Action, Application No. 2006-073351, Oct. 18, 2010.

* cited by examiner

*Primary Examiner* — Man Phan  
*Assistant Examiner* — Mohamed Kamara  
(74) *Attorney, Agent, or Firm* — Sughrue Mion, PLLC

(57) ABSTRACT

Provided is a time switch capable of allowing a user to readily set up or change a schedule. For this purpose, a chassis 30 of the time switch 10 has same size (i.e., two-row-module size) as that obtained by arranging two three-module sized implanted type wiring devices in two lines along a minor width direction, and installation frame pieces 38 are protruded from both of upper and lower side walls. In addition, each installation frame piece 38 has a long hole 38a for inserting a box screw fastened to the implanted type box (not shown) implanted on the installation surface or a fastener hole combined with a fastener. Furthermore, decoration covers 33 and 34 are installed in the front side of the chassis 30, and manipulating buttons 45a to 45f of the setup manipulation unit for setting up a time schedule having a set of an address corresponding to the control target load, and a control time and a control item for the load are provided in the decoration cover 33 functioning as a manipulation face of the setup unit 10a.

11 Claims, 9 Drawing Sheets

| 10 - time switch | T1 & 2 - signal line connection terminals | T3 & 4 - brightness sensor connection terminals | T5 & 6 - external contact connection terminals |
|---|---|---|---|

| 10 - switch | 10a - setup unit | 10b - switch unit | 16 - LCD unit |
| 30 - chassis | 31 - body | 32 - covering | 33 - decoration cover |
| 33d - pivoting member | 34 - decoration cover | 38 - fixing frame piece | 38b - screw passing hole |
| 38d - plate screw hole | 44 - name sheet | 44a - transparent portion | 45 - name sheet |
| 45b - driving switch key | 45c - up key | 45d - down key | 45e - recovery key |
| 45f - setup key | 46 - name sheet | 46a - manipulating portion | 46b & c - transparent portions |
| 48 - door | | | |

Fig. 2

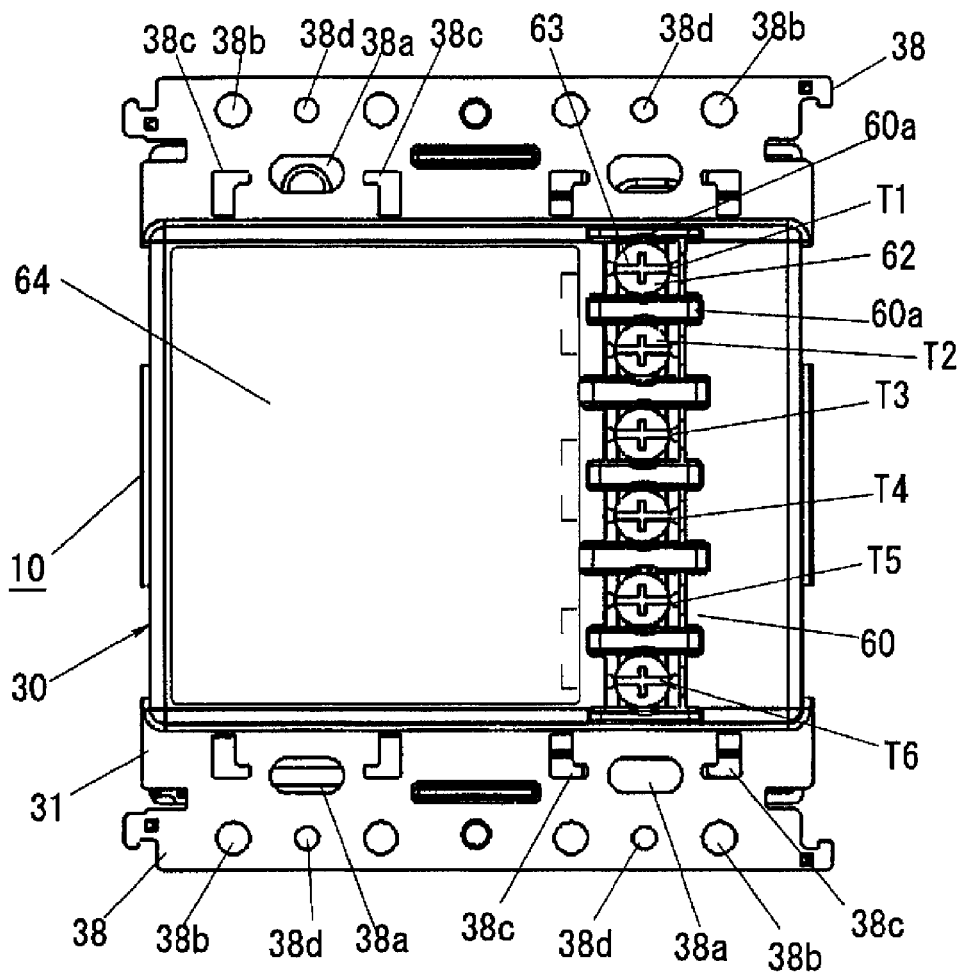

| 10 - time switch | 30 - chassis | 31 - body | 38 - fixing frame pieces |
| --- | --- | --- | --- |
| 38a - long hole | 38b - screw passing hole | 38c - insertion hole | 38d - plate screw hole |
| 60 - terminal block | 60a - insulation walls | 62 - terminal screw | 63 - lock washer |
| 64 - terminal identification sheet | T1 - signal line connection terminal | T2 - signal line connection terminal | T3-4 - brightness sensor connections terminals |
| T5-6 - external contact connection terminals | | | |

Fig. 3

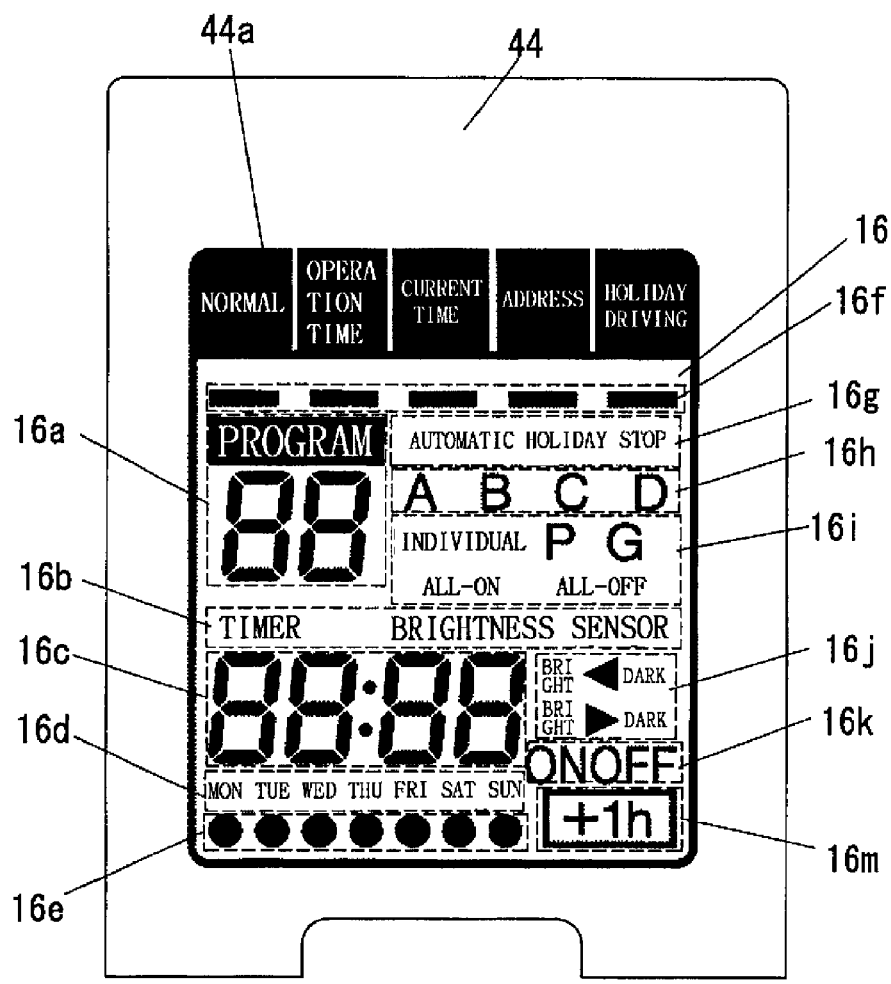

| 16 - LCD unit | 16a - program number display portion | 16b - operation manner display portion | 16c - time display portion |
| --- | --- | --- | --- |
| 16d - weekday display portion | 16e - activity/inactivity display portion | 16f - mode display portion | 16g - driving display portion |
| 16h - manipulating display portion | 16i - function display portion | 16j - brightness direction display portion | 16k - control item display portion |
| 16m - summer time display portion | 44 - name sheet | 44a - transparent portion | |

Fig. 4

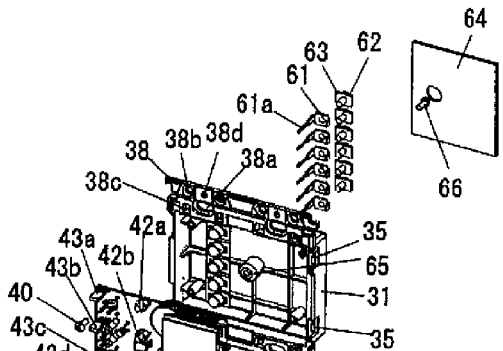
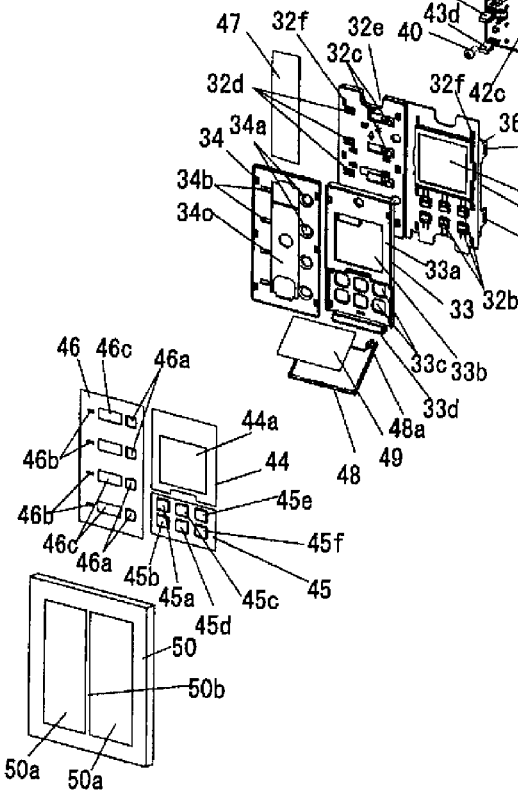

| 16 - LCD unit | 31 - body |
|---|---|
| 32 - covering | 32a - rectangular window |
| 32b - hinge portion | 32c - hinge portion |
| 32d - holes | 32e - notches |
| 32f - claw holes | 33 - decoration cover |
| 33a - protruded base portion | 33b - rectangular window |
| 33c - holes | 33d - pivoting member |

| 34 - decoration cover | 34a & b - insertion holes |
|---|---|
| 34c - saddle portion | 35 - engagement protrusions |
| 36 - engagement receptacles | 37 - holes |

| 38 - frame piece | 38a - long hole |
|---|---|
| 38b - screw passing hole | 38c - insertion hole |
| 38d - plate screw hole | 39 - print wiring board |
| 40 - screws | 41 - switch group |
| 42a-b - manipulating switches | 43a-d - light emitting diodes |
| 44 - name sheet | 44a - transparent portion |
| 45 - name sheet | 45a-f - manipulating buttons |
| 46 - name sheet | 46a - manipulating portion |
| 46b - transparent portion | 46c - transparent portion |
| 47 - name sheet | 48 - door |
| 48a - axis | 49 - name sheet |
| 50 - plate member | 50a - window |
| 50b - window | 61 - terminal plate |
| 61a - soldering pieces | 62 - terminal screw |
| 63 - lock washer | 64 - terminal identification sheet |
| 65 - screw holes | 66 - fixation screws |

| 10 - time switch | T1 & 2 - signal line connection terminals | T3 & 4 - brightness sensor connection terminals | T5 & 6 - external contact connection terminals |

| Vs - transmission signal | ST - start pulse | MD - mode data | AD - address data |
| CD - control data | CS - checksum data | WT - signal returning time period | Vi - interrupt signal |

TIME SWITCH

BACKGROUND OF THE INVENTION

1. Technical Field

The present invention relates to a time switch.

2. Related Art

Conventionally, there has been provided a remote monitoring control system in which a manipulating switch wiring appliance for monitoring switch inputs from a manipulating switches and a remote control wiring appliance for controlling a turning-on/off operation of the corresponding loads are connected to a transmission control device through a double-wire signal line, an individual address is allocated to each wiring appliance, a transmission signal containing the address is transmitted and received between the transmission control device and each wiring appliance using a time division multiplexing transmission scheme.

The transmission control device individually has an access to the manipulating switch wiring appliance and the remote control wiring appliance by transmitting a transmission signal containing address data to the signal line, generates control data on the basis of the monitoring data when monitoring data is received from the manipulating switch wiring appliance having a monitoring input during a signal returning time period that has been set in synchronization with the transmission signal, and controls the loads connected to the remote control wiring appliance by transmitting the control data to the remote control wiring appliance in which a relationship between the address and the manipulating switch wiring appliance that has generated the monitoring data is previously set.

In such a remote monitoring control system, a time switch for automatically controlling turning-on/off operations of the loads at a predetermined time point is often used without controlling the turning-on/off operation of the load by manipulating the manipulating switches provided in the manipulating switch wiring appliance. In the time switch, a time schedule for designating a control time for controlling the load and a control item such as an individual control, a group control, and a pattern control on a daily basis in a week is registered, and the control time of the timer schedule is compared with a current time, so that a no-voltage contact signal is output by opening or closing an output relay selected according to the control item when the control time corresponds with the current time. Each input terminal of the contact input terminal unit is connected to each contact signal output terminal provided at the time switch. In the contact input terminal unit, monitoring data is transmitted to a transmission controller according to the contact signal output from the time switch, and the transmission controller transmits control data to the remote control wiring appliance according to the monitoring data, so that a load control according to the control item of the schedule is performed at the control time. In addition, there was a time switch which has a function of transmitting and receiving a transmission signal using a time division multiplexing transmission scheme, and transmits a transmission signal containing the control item and the address corresponding to the control target load from the time switch to the signal line by using the time switch as a terminal unit of the remote monitoring control system when the control time corresponds with the current time, in order to perform the timer control of the load (for example, refer to the patent document 1 described below).

[Patent Document 1] Japanese Unexamined Patent Application Publication No. 2002-16987 (Paragraphs [0027] to [0034] and FIGS. 1 and 2)

A chassis of the time switch was manufactured to fit the size of a standardized wiring circuit breaker for distributing board in a light system so as to be assembled with the distributing board. The schedule was set by a constructor. Therefore, when a user wants to set up or change the schedule, a user should go to an installation area of the switchboard to complete the work. Accordingly, it was difficult for a user to set up or change the schedule.

SUMMARY OF THE INVENTION

The present invention has been made to solve the aforementioned problems, and an object of the present invention is to provide a time switch capable of allowing a user to readily set up or change the schedule.

In order to achieve the aforementioned object, an invention of claim 1 provides a time switch used in a remote monitoring control system in which a manipulating switch wiring appliance for monitoring switch manipulation of manipulating switches to which individual addresses are allocated, and a remote control wiring appliance for controlling open or close of the relays to which individual addresses are allocated are connected to a signal line, the manipulating switch wiring appliance outputting a transmission signal containing a monitoring input and address information from the manipulating switch to the signal line using a time division multiplexing transmission scheme, and the remote control wiring appliance opening or closing the relays on the basis of the monitoring input of the transmission signal when the address information contained in the transmission signal received through the signal line corresponds with an address of the corresponding relay, in order to turn on or off the load connected to the relay, the time switch comprising: a program storage unit which stores sets of addresses corresponding to the loads to be controlled, control items, and control times of the loads as a time schedule; a setup manipulation unit which sets up the addresses, the control items, and the control times and stores those in the program storage unit as a time schedule; a clock unit which counts a current time; a signal transceiver unit which transmits and receives a transmission signal through the signal line by using a time division multiplexing transmission scheme; and a signal processing unit which prepares a transmission signal containing the addresses and the control items in the time schedule as the address information and the monitoring input and transmits the transmission signal from the signal transceiver unit to the signal line when the control time contained in each set of the time schedule stored in the program storage unit corresponds with the current time counted by the clock unit, wherein the program storage unit, the clock unit, the signal transceiver unit, and the signal processing unit are received in a switch chassis implanted in a wall surface with its front surface being exposed, and the setup manipulation unit is arranged in a front surface the switch chassis.

An invention of claim 2 provides the time switch according to claim 1, wherein the manipulating switches, to which the addresses registered in the program storage unit are allocated, arranged in the front surface of the switch chassis, and the signal processing unit prepares a transmission signal containing the control item for reversing the turning on or off operation of the corresponding load as the monitoring input by using the address allocated to the switch as the address information and transmits the transmission signal from the signal transceiver unit to the signal line when the manipulating switches are manipulated.

An invention of claim 3 provides the time switch according to claim 1 or 2, further comprising a driving switching means for switching a driving mode of the signal processing unit to an automatic driving mode in which a timer control according to the time schedule is applied to all of the addresses registered in the program storage unit or a special day driving mode in which a timer control according to the time schedule is applied to only a selected address, and a setup switching means for switching whether or not the timer control according to the time schedule should be applied to each address in the special day driving mode.

An invention of claim 4 provides the time switch according to claim 3, further comprising an external contact connection terminal to which a contact signal for switching the driving mode of the signal processing unit to one of the automatic driving mode and the special day driving mode is input, wherein the signal processing unit switches the driving mode to the automatic driving mode or the special day driving mode on the basis of the contact signal input through the external contact connection terminal.

An invention of claim 5 provides the time switch according to any one of claims 1 to 4, further comprising a brightness sensor connection terminal to which a brightness sensor having an output signal which changes according to an ambient brightness and a predetermined brightness reference value is connected, wherein the brightness sensor is supplied with power through the brightness sensor connection terminal and changes a voltage between terminals according to the change of the output signal, and the program storage unit stores at least a time schedule in which a changing direction of the output signal of the brightness sensor is set instead of the control time for applying the corresponding control item.

An invention of claim 6 provides the time switch according to any one according to claims 1 to 4, further comprising a summer time conversion switch for selection between a summer time condition in which a current time of the clock unit is counted a predetermined time earlier and an original condition in which the current time of the clock unit is originally counted.

BRIEF DESCRIPTION OF THE DRAWINGS

FIG. 2 is a rear side view of a time switch according to an embodiment of the present invention;

FIG. 3 is an explanatory view illustrating display items of a liquid crystal display (LCD) unit in the time switch according to an embodiment of the present invention;

FIG. 4 is an exploded perspective view of a time switch according to an embodiment of the present invention;

DETAILED DESCRIPTION OF THE INVENTION

A time switch which will be described below according to the present embodiment is usually installed in facilities such as typical dwelling units, offices, and schools and performs a timer control for the objective loads on the basis of a predetermined weekly schedule. Needless to say, although control of a lighting load is described as an example in the present embodiment, the load is not limited to the lighting load, but the present embodiment can be applied to any load required to be operated on the basis of a schedule.

Figure 5:
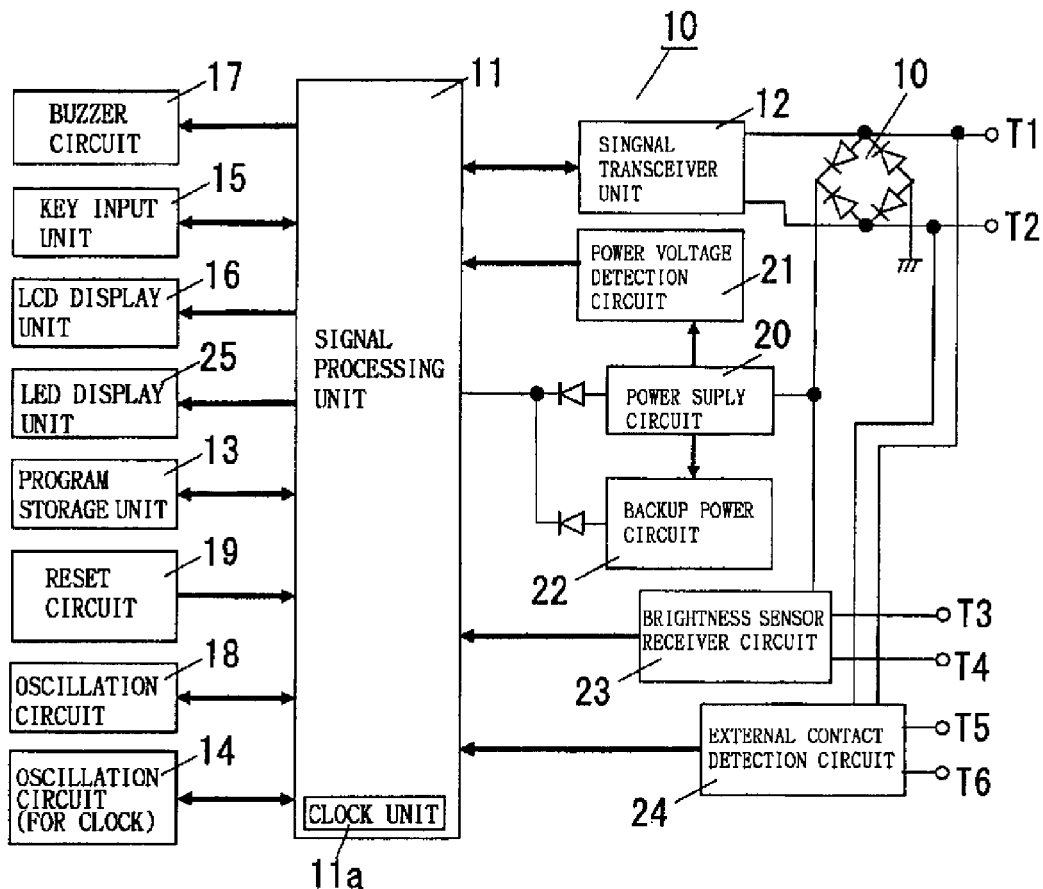
FIG. 5 is a block diagram of a time switch according to an embodiment of the present invention.
Figure 6:
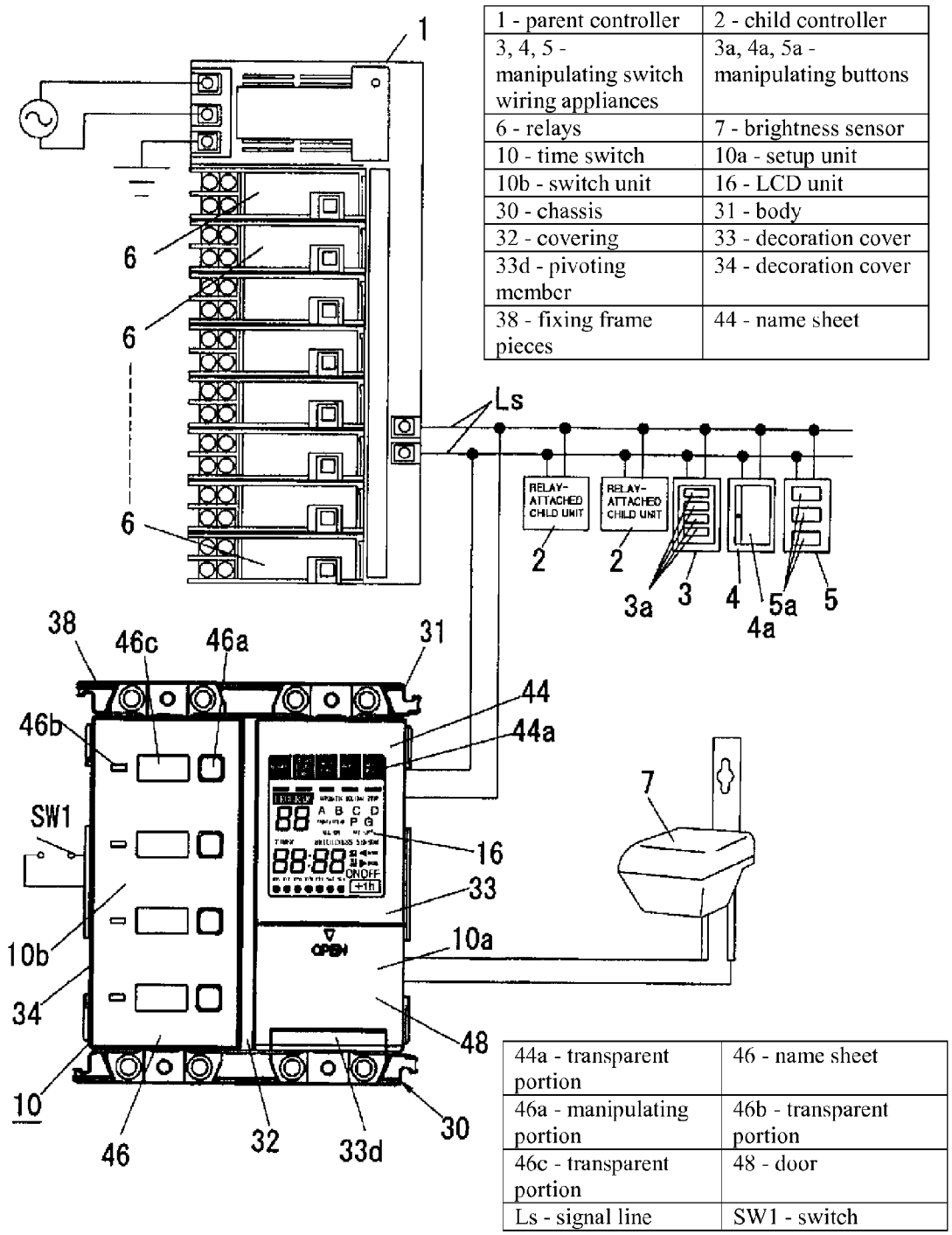
FIG. 6 is a constructional view of a remote monitoring control system adapting a time switch according to an embodiment of the present invention.

The time switch 10 of the present embodiment is usually connected to a signal line Ls in a remote monitoring control system as shown in FIG. 6. Accordingly, a basic construction of the remote monitoring control system will be described firstly with reference to FIG. 6. In this remote monitoring control system, a relay-attached parent unit (hereinafter, referred to as a parent controller 1), a plurality of (e.g., two in FIG. 5) relay-attached child units (hereinafter, referred to as a child controller 2), a plurality of (e.g., three in FIG. 5) manipulating switch wiring appliances 3 to 5 are connected through a double-wire signal line Ls (i.e., a multi-drop connection structure).

It should be noted that the present system has two kinds of wiring appliances (i.e., the parent controller 1 and the child controller 2) as a remote control wiring appliance for controlling relays for turning on/off power supply to the loads (i.e., lighting load and the likes), where the parent controller 1 has relays 6 reserved for eight-circuit units, and the child controller 2 has relays reserved for four-circuit units. On the other hand, the manipulating switch wiring appliance 3 has a plurality of manipulating buttons 3a of a pattern switch for collectively controlling (i.e., a pattern control) a plurality of loads to satisfy individual control conditions that have been previously set in order to monitor a manipulated state of each pattern switch. In addition, the manipulating switch wiring appliance 4 has a manipulating button 4a of a group switch for collectively controlling (i.e., a group control) a plurality of loads to the same control state to monitor a manipulated state of the group switch. In addition, the manipulating switch wiring appliance 5 has a plurality of manipulating buttons 5a of individual switches for separately controlling (i.e., an individual control) the corresponding loads to monitor the manipulated states of a plurality separate switches.

Individual addresses are set to the relays provided in the parent controller 1 and the child controller 2 and the manipulating buttons 3a, 4a, and 5a provided in the manipulating switch wiring appliances 3 to 5, respectively. The parent controller 1 manages an address look-up relationship between the relays (i.e., loads) and the switches. That is, the parent controller 1 can individually recognize the relays of the parent controller 1 and the child controller 2 and the switches of the manipulating switch wiring appliances 3 to 5 using those addresses as well as controls relays (loads) of one or more circuits having a look-up relationship with respect to the monitoring input of the switches.

Figure 9:
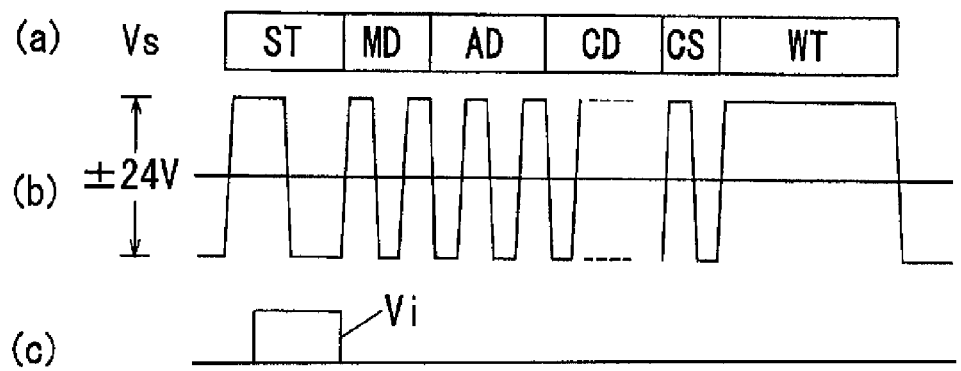
FIG. 9 is an explanatory view of a transmission signal used in a remote monitoring control system.

The parent controller 1 functions as a transmission control device and transmits a transmission signal Vs having a format shown in FIG. 9A to the signal line Ls. In other words, as shown in FIG. 9B, the transmission signal Vs is a alternating current type (±24V) time division multiplexing signal containing a start pulse signal ST indicating starting to transmit the signal, mode data MD indicating a mode of the transmission signal Vs, address data AD for separately calling the parent controller 2 or the manipulating switch wiring appliances 3 to 5, control data CD for controlling the relays or loads, checksum data CS for detecting transmission errors, and a signal returning time period WT which is a time slot for receiving a returning signal (i.e., monitoring data) from the child controller 2 or the manipulating switch wiring appliances 3 to 5, and is arranged to transmit the data by a pulse width modulation. The child controller 2 and the manipulating switch wiring appliances 3 to 5, when the address data AD transmitted by the transmission signal Vs received through the signal line Ls corresponds with a predetermined address, receive the control data CD from the transmission signal Vs as well as returns monitoring data within the signal returning time period WT of the transmission signal Vs as a current mode signal (which is a signal transmitted by short-circuiting the signal line Ls through an appropriate low impedance element).

Here, in case of data transmission from the parent controller 1 to a desired child controller 2 or manipulating switch wiring appliances 3 to 5, the transmission signal Vs, which the mode data MD is set to a control mode, and addresses allocated to the relays of the child controller 2 or the switches of the manipulating switch wiring appliances 3 to 5 are arranged to the address data AD, is transmitted. When the transmission signal Vs is transmitted to the signal line Ls, the child controller 2 or the manipulating switch wiring appliance 3 to 5 corresponding to the address data receives the control data CD and returns monitoring data within a signal returning time period WT. The parent controller 1 identifies whether or not the control data CD are transmitted to the desired child controller 2 or the manipulating switch wiring appliances 3 to 5 on the basis of the relationship between the transmitted control data CD and the monitoring data received within the signal returning time period WT. The child controller 2 controls relays of the addresses corresponding to the received control data CD. In addition, the manipulating switch wiring appliances 3 to 5 output a monitoring signal for indicating an operation state of the relay on the basis of the received control data CD.

In addition, the parent controller 1 ordinarily transmits a transmission signal Vs at a predetermined time interval (i.e., a round-the-clock polling) by setting the mode data MD to a dummy mode, and generates an interrupt signal Vi, as shown in FIG. 9C, in synchronization with the start pulse signal ST of the transmission signal Vs set to a dummy mode when the manipulating switch wiring appliances 3 to 5 are to transmit certain information to the parent controller 1. Then, the manipulating switch wiring appliances 3 to 5 establish an interrupt flag to prepare subsequent transmission/receipt of information to/from the parent controller 1. The parent controller 1, when receives the interrupt signal Vi, set up the mode data MD to an interrupt polling mode, and transmits the transmission signal with incrementing successively an upper half bits of the address data AD. The manipulating switch wiring appliances 3 to 5 that have generated the interrupt signal return a lower half of bits of the address during the signal returning time period WT when the an upper half of bits of the address data AD included in the transmission signal transmitted on the interrupt polling mode corresponds with an upper half of bits of addresses allocated to the corresponding switches therein.

When the parent controller 1 obtains the address of the manipulating switch wiring appliance 3 to 5 (i.e., the address of the manipulated switch) that has generated the interrupt signal, a transmission signal containing the obtained address data AD is transmitted to the signal line Ls by setting the mode data MD to a monitoring mode, and the manipulating switch wiring appliance 3 to 5 returns information to be transmitted within a signal returning time period in response to the transmission signal. Finally, the parent controller 1 transmits a signal for instructing an interrupt reset operation to the manipulating switch wiring appliances 3 to 5 that have generated the interrupt signal, and releases the interrupt flag of the manipulating switch wiring appliances 3 to 5. As a result of the above process, information transmission from the manipulating switch wiring appliances 3 to 5 to the parent controller 1 is completed using 4 signal transmission chances (e.g., a dummy mode, an interrupt polling mode, a monitoring mode, and an interrupt reset) from the parent controller 1 to the manipulating switch wiring appliances 3 to 5. Furthermore, the parent controller 1 can identify an operation condition of a desired child controller 2 just by transmitting a transmission signal to the parent controller 1 by setting the mode data MD to the monitoring data.

The above operation can be summarized as follows. Firstly, when input data are generated by manipulating the manipulating buttons 3a to 5a of each switch, the monitoring data corresponding to the data input from the manipulating switch wiring appliances 3 to 5 are returned to the parent controller 1. The parent controller 1 controls the corresponding relay when the address of the manipulated switch corresponds to the address of the relay provided in the parent controller 1, while the parent controller 1 transmits the control data CD to the child controller 2 when the address of the manipulated switch corresponds to the address of the relay provided in the child controller 2 in order to control the relay corresponding to the child controller 2. In addition, the parent controller 1 also manages a look-up relationship between the pattern switches or the group switches and the addresses of the relays, can collectively control the relays of a plurality of circuits in synchronization with manipulation of any one of the switches.

As described above, although the present system can control a turning-on/off operation of the loads by turning on/off the corresponding relay in synchronization with the manipulation of the manipulating buttons 3a to 5a of the manipulating switch wiring appliances 3 to 5, a time switch 10 for performing a timer control operation of the corresponding load on the basis of a predetermined schedule is provided. Hereinafter, a time switch 10 according to the present invention will be described.

As shown in FIG. 5, the time switch 10 includes: a signal processing unit 11 having a microcomputer; a signal transceiver unit 12 connected to the signal line Ls through signal line connection terminals T1 and T2 to transmit/receive the transmission signal through the signal line Ls using a time division multiplexing scheme; a program storage unit 13 formed of a non-volatile memory such as an EEPROM to store various schedules and settings which will be described later; an oscillation circuit 14 for supplying a timing clock signal to a clock unit 11a integrated in the signal processing unit 11; a key input unit 15 for receiving manipulation from a switch group 41 or a manipulating switch 43a which will be described later; a LCD unit 16 for displaying various setting items on a display screen; an LED display unit 25 for displaying various setting items or operation states of the loads; a buzzer circuit 17 for generating various sounds such as a manipulation sound of the key input unit 15 or an error sound; an oscillation circuit 18 for supplying an operation clock to the microcomputer of the signal processing unit 11; a reset circuit 19 for resetting the microcomputer; a power supply circuit 20 for supplying an operation voltage by smoothing and stabilizing a DC power voltage obtained by performing full wave rectification for the transmission signal input through the signal line Ls using a diode bridge DB; a power voltage detection circuit 21 for monitoring the power voltage from the power supply circuit 20 to detect a power failure; a back-up power supply circuit 22 for supplying power to the signal processing unit 11 by using a condenser charged during the current is supplied as a power supply when the power failure occurs and for backing up the timing of the clock unit 11a; a brightness sensor receiving circuit 23 for supplying an operation voltage to the brightness sensor 7 connected to the brightness sensor connection terminals T3 and T4 as well as detecting change of the output of the brightness sensor. 7 on the basis of a difference of voltages between the terminals and transmitting the detection result to the signal processing unit 11; and an external contact detection circuit 24 for transmitting a contact signal of the switch SW1 (i.e., an external contact) connected to the external contact connection terminals T5 and T6 to the signal processing unit 11.

The power voltage detection circuit 21 detects a power failure by monitoring the power voltage from the power supply circuit 20 and transmits a power failure detection signal to the signal processing unit 11. When the power failure detection signal is input from the power voltage detection circuit 21, the signal processing unit 11 is switched to a standby mode in which miscellaneous functions other than essential functions such as the clock unit 11a are halted in order to save power consumption, and receives power supply from the backup power supply unit 22 and allows the timing operation of the clock unit 11a to be continued during a predetermined power failure compensation period. In addition, since the clock unit 11a may stop and lose the current time when the power failure continues over the power failure compensation period, it may be required to set the time when the power supply is recovered. However, since various programs or setup information are stored in the program storage unit 13 consisting of a non-volatile memory, it is possible to prevent data loss even when the power failure occurs.

The signal transceiver unit 12 is connected to the signal line Ls through the signal line connection terminals T1 and T2 in order to function as a terminal unit of the remote monitoring control system, generates an interrupt signal Vi similarly to the manipulating switch wiring appliances 3 to 5 when the monitoring input generated in the signal processing unit 11 is received, and transmits various instructions based on the control data CD of the transmission signal Vs when the transmission signal Vs transmitted through the signal line Ls is received.

The program storage unit 13 stores the address of the relay to which the control target load is connected, and sets of control item and control timings for the load as a time schedule on a daily basis in a week. The signal processing unit 11 controls the load designated by the time schedule according to the control item when the current time (i.e., a day of the week, an hour and a minute in case of this embodiment) counted by the clock unit 11a integrated in the signal processing unit 11 corresponds with the control timing set in the time schedule of the corresponding day. In the present embodiment, the control target load is designated by the address in the time schedule, and the signal processing unit 11 transmits the designated address to the signal transceiver unit 12 together with the control item. The signal transceiver unit 12 transmits and receives the transmission signal using the address and the control item received from the signal processing unit 11. In other words, the signal transceiver unit 12 is operated similarly to the manipulating switch wiring appliances 3 to 5 by using the address received from the signal processing unit 11 as the transmission address and using the control item as the monitoring input. Here, assuming that a look-up relationship between the monitoring inputs (i.e., the manipulating buttons 3a to 5a of the manipulating switch wiring appliances 3 to 5) and the loads (i.e., the relays of the parent controller 1 and the child controller 2) is previously established in the parent controller 1, it is possible to select the load corresponding to the monitoring input as the control target by setting the address corresponding to that of the monitoring input in the time schedule. Therefore, it is possible to implement group control or pattern control in addition to the aforementioned individual control, and thus, a plurality of loads can be collectively controlled in appropriate control timings.

In order to set the time schedule, a key input unit 15 and a liquid crystal display (LCD) unit 16 for transmitting the control input from the switch group 41, which will be described later, to the signal processing unit 11 are used. As shown in FIG. 4, the switch group 41 used as a setup manipulation unit includes a plurality of (e.g., 6 in case of this embodiment) switches of which manipulation is performed by pressing them, and the manipulated information of the switch group 41 is input to the signal processing unit 11 through the key input unit 15. In addition, the LCD unit 16 is adapted to display a time schedule of setting up, the time schedule stored in the program storage unit 13, the current time, an operation mode of the signal processing unit 11, and the like on a liquid crystal display screen. Furthermore, the switch group 41 and the LCD unit 16 are adapted to set a set of the control time, the control item, and the address of the load as a time schedule on a daily basis in a week. In other words, it is preferable to set up the control time and the control item in the address (which is identical with address of the load) of the monitoring input corresponding to the load to be controlled on a daily basis in a week.

Here, the time schedule is basically set on a daily basis, and the control time in the time schedule is indicated on the basis of a combination of a day, an hour, and a minute. In addition to the daily time schedule (also, referred to as a basic schedule), a scheduled control operation may be performed for a part of the loads on a particular day such as a holiday, it is also possible to set a temporary time schedule (also, referred to as a special day schedule) in which the load to be controlled on a special day is selected. For example, when it is required to turn off indoor lights but turn on outdoor lights in typical offices or shops on a holiday or the like, a user may implement a scheduled control for only the outdoor lights by selecting the outdoor lights as the load to be controlled on a particular day without turning on the indoor lights. In other words, the signal processing unit 11 has an automatic driving mode based on a basic schedule and a holiday driving mode (or a special day driving mode) based on a special day schedule, so that both driving modes can be switched as follows. Specifically, the time switch 10 has external contact connection terminals T5 and T6, to which a no-voltage external contact input can be connected. A typical switch SW1 is used as the no-voltage external contact input as shown in FIG. 6. The external contact detection circuit detects a turning-on/off operation of the switch SW1 connected to the external contact connection terminals T5 and T6, and outputs the detection result to the signal processing unit 11. The signal processing unit 11 controls the load on the basis of the basic schedule (i.e., in an automatic driving mode) when the switch SW1 is turned on, while controls the load on the basis of the special day schedule (i.e., in a holiday driving mode) when the switch SW1 is turned off.

In addition, the time schedule stored in the program storage unit 13 may use change of the output of the brightness sensor 7 instead of the control time for implementing the control items. The brightness sensor 7 is manufactured by using a conventional well-known EE switch having a detection element such as a photodiode for detecting an ambient brightness, and has an output signal that changes according to the ambient brightness detected by the detection element and a predetermined reference brightness value. The voltage between the terminals T3 and T4 is adapted to switch between high and low levels on the basis of the change of the output signal of the brightness sensor 7. The brightness sensor receiver circuit 23 determines the ambient brightness and the reference brightness value on the basis of the change of the voltage between the terminals T3 and T4, and transmits the determination result to the signal processing unit 11. If the program storage unit 13 stores a time schedule for starting the control when the brightness detected by the brightness sensor 7 is lower than the reference brightness value and terminating the control when a predetermined control termination time is reached, the signal processing unit 11 transmits to the signal transceiver unit 13 a transmission signal for turning on the corresponding load when the brightness sensor 7 detects that the ambient brightness is lower than the reference value on the basis of the output of the brightness sensor receiver circuit 23 in synchronization with the current time counted by the clock unit 11a. Subsequently, when the current time counted by the clock unit 11a corresponds with the control termination time, a transmission signal for turning off the load is transmitted to the signal transceiver unit 13. In addition, when the brightness sensor 7 is connected to the brightness sensor connection terminals T3 and T4, power is supplied from the brightness sensor receiver circuit 23 to the brightness sensor 7, and the voltage difference between the terminals T3 and T4 changes. As a result, it is possible to detect the change of the output signal from the brightness sensor 7. Therefore, it is not necessary to separately provide a wiring line for inputting the signal in addition to the wiring line for supplying power, and it is possible to readily perform a wiring work by using only two small electrical lines.

Hereinafter, a construction of the time switch 10 will be described with reference to FIGS. 1 to 4. In the following description, unless defined otherwise, upper, lower, left, and right directions are defined with respect to the front side of the FIG. 1. Therefore, the front of FIG. 2 is the rear of the time switch shown in FIG. 1.

A chassis 30 of the time switch 10 is formed by assembling a body 31 and a covering 32 made of a synthetic resin material. The front side of the covering 32 is provided with left and right decoration covers 34 and 33. The right decoration cover 33 functions as a control panel of the setup unit 10a for setting up the schedule or the like, and the left decoration cover 34 functions as a control panel of the switch unit 10b for a manual manipulation.

The chassis 30 has a same size substantially as that (two-row-module size) obtained by arranging two implanted type wiring appliances which each has a three-module size (which is a size obtained by arranging three implanted type wiring appliances each having a unit size in direction of a minor width) in two lines along a minor width direction, and is mounted on an installation surface (e.g., a wall surface of a building) with its front side being exposed. Since the chassis 30 is implanted on the wall surface with its front side being exposed, and the setup unit 10a is provided on the front side of the chassis 30, a user can readily set up or change the time schedule even after the time switch 10 is installed.

The body 31 has a rectangular box shape elongated in a longitudinal direction and opened in its front side. A pair of engagement protrusions 35 are provided on the front edges of both left and right side walls and vertically separated from each other. On the other hand, the covering 32 has a rectangular plate shape having the same size as that of an opening of the body 31. A pair of engagement receptacles 36 is backwardly protruded from both of left and right side edges. When the body 31 and the covering 32 are assembled with each other, the holes 37 formed in the engagement receptacles 36 of the covering 32 are engaged with the engagement protrusions 35 formed in the body 31, and fixation screws 66 passing through the screw holes 65 of the body 31 are engaged with the threads (not shown) formed in the rear side of the covering 32.

A terminal block 60 having connection terminals T1 to T6 is provided on the rear side of the body 31. Each of the connection terminals T1 to T6 of the terminal block 60 consists of a terminal plate 61 forcibly inserted into the insertion hole formed in the rear side of the body 31 and a terminal screw 62 combined with a screw hole of the terminal plate 61. Also, insulation walls 60a are protruded from the rear side of the body 31 in upper and lower gaps between the terminal plates 61. In addition, a terminal identification sheet 64 for indicating purposes of each connection terminal T1 to T6 is attached to the rear side of the body 31. A wire can be connected to the terminal block 60 by loosening the terminal screw 62, then inserting the wire between the terminal plate 61 and the lock washer 63 being loosened with a sufficient margin, and then tighten the terminal screw 62. Then, the wire gets stuck between the terminal plate 61 and the lock washer 63.

Furthermore, fixing frame pieces 38 are extended to upper and lower directions from the front edges of both upper and lower side walls of the body 31, respectively. Each fixing frame piece 38 at least includes: a long hole 38a for passing through a box screw to fasten to the implanted type box (not shown) implanted on the installation surface; a screw passing hole 38b for passing through an fixation screw to directly fasten the chassis 30 to a wall material and the like; a insertion hole 38c for inserting a conventional claw (not shown) to fasten to a gypsum board and the like forming a wall by interposing the gypsum board between the claw and the rear surface of the fixing frame piece 38; and a plate screw hole 38d combined with the plate screw for installing a plate member 50 (consisting of a plate frame and an decoration plate) having a window for exposing each manipulating panel (i.e., the decoration covers 33 and 34) of the chassis 30. In addition, when the plate member 50 is installed, the decoration cover 33 of the setup unit 10a and the decoration cover 34 of the switch unit 10b are separated from each other by a vertical bar 50b separating the windows 50a and 50b from each other. This allows the switch unit 10b to have appearance similar to a typical wall switch. Therefore, a user can manipulate the switch without uncomfortable feelings.

A print wiring board 39 having a circuit shown in FIG. 5 is fixed to the inside of the body 31 using three screws 40, and soldering pieces 61a of the terminal plate 61 are soldered to the print wiring board 39. A liquid crystal display of the LCD unit 16 is mounted in an upper portion of the right half of the print wiring board 39, and a switch group 41, which consists of six push button switches, functioning as a setup manipulation unit is mounted under the liquid crystal display. In addition, four sets of manipulating switches 42a to 42d and light-emitting diodes 43a to 43d are vertically arranged on a left half of the print wiring board 39. Specifically, the four manipulating switches 42a to 42d are aligned near the center of the chassis 30, while four light-emitting diodes 43a to 43d are aligned in the left side of the chassis 30.

On the other hand, the covering 32 has a rectangular window 32a opened to a part opposite to the LCD unit 16 mounted on the print wiring board 39 in order to expose the LCD unit 16. In addition, the covering 32 has hinge portions 32b and 32c cantilevered from each footstall side of the covering 32 by slitting around of a region opposite to each of the push buttons of the push button switches and manipulating switches 42a to 42d consisting of the switch group 41, so that the corresponding push buttons can be pressed down by the rear surface of each forefront of the hinge portions functioning as a free end. In addition, the covering 32 has through holes 32d in the locations opposite to the light emitting diodes 43a to 43d of the print wiring board 39 in order to passing through the light-emitting portions of the light-emitting diodes 43a to 43d, respectively. Furthermore, notches 32e are provided in upper, lower, left and right edges of the covering 32 in order to avoid interference with the fixation screws installed in the locations opposite to the long holes 38a of the installation frame piece 38.

The decoration cover 33 is combined with the covering 32 by engaging the claws (not shown) formed on the rear side of the decoration cover 33 with the claw holes 32f of the covering 32, in the form of covering almost a right half of the front surface of the covering 32. In an upper side portion of the decoration cover 33, a protruded base portion 33a is provided with a height larger than the lower side portion of the decoration cover 33, and the protruded base portion 33a has a rectangular window 33b for exposing the display screen of the LCD unit 16. Also, in the lower side portion of the decoration cover 33, through holes 33c for passing through the pressing portions of the six hinges 32b of the covering 32 are provided, respectively.

In addition, name sheets 44 and 45 formed of a synthetic resin are attached to the front surface of the decoration cover 33 to cover the protruded base portion 33a and the remaining portion, respectively. The name sheet 44 covering the protruded base portion 33a has a transparent portion 44a in order that the display screen of the LCD unit 16 comes in sight through it. FIG. 3 is an explanatory diagram illustrating a display screen of a LCD unit 16. The liquid crystal display screen includes: a program number display portion 16a for displaying program numbers allocated to the time schedule; an operation manner display portion 16b for displaying an operation manner (i.e., a timer control or a brightness sensor control); a time display portion 16c for displaying a current time or a control time on a minute and second basis; a weekday display portion 16d for displaying a day of the week; an activity/inactivity display portion 16e for displaying whether or not the schedule control is to be performed in each day of the week; a mode display portion 16f for displaying the current operation mode of the signal processing unit 11; a driving display portion 16g for displaying a driving condition (i.e., an automatic driving based on a basic schedule, a holiday driving based on a special day schedule, or a driving stop in which the timer control is stopped); a manipulating switch display portion 16h displaying a setup or control target selected from the loads A to D corresponding to the manipulating switches 42a to 42d; a function display portion 16i for displaying the functions (e.g., an individual control, a pattern control P, a group control G, an all-ON, or an all-OFF) of each manipulating switch 42a to 42d; a brightness direction display portion 16j for displaying a brightness direction which will be described later; a control item display portion 16k for displaying control item (ON or OFF) when the schedule is setting and checking after that; and a summer time display portion 16m for displaying whether or not a summer time rule is executed.

On the other hand, the name sheet 45, which is called a membrane sheet having a sheet shape formed of a flexible synthetic resin, has manipulating buttons 45a to 45f swelled out in the regions opposite to each through hole 33c. In addition, a pivoting member 33d for pivoting the axis 48a of the door 48 which openable covers the portion of the name sheet 45 is provided in the lower side edge of the decoration cover 33, and a name sheet 49 for indicating how to manipulate the switch group is attached to the rear surface of the door 48.

In addition, similar to the decoration cover 33, the decoration cover 34 is combined with the covering 32 by engaging the claws (not shown) provided in its rear side with the claw holes 32f of the covering 32, in order to form of covering almost a left half of the front surface of the covering 32. The decoration cover 34 has through holes 34a for passing through the pressing portions of the four hinges 32c of the covering 32 as well as through holes 34b connected to the four insertion holes 32d of the covering 32. In addition, the decoration cover 34 has a saddle portion 34c vertically elongated in the center for duly seating the name sheet 47. A name sheet 46 having a size similar to that of the front surface of the decoration cover 34 is attached to the front surface of the decoration cover 33. The name sheet 46, which is called a membrane sheet having a sheet shape formed of a flexible synthetic resin, has manipulating portions 46a swelled out in the locations opposite to the insertion holes 34a. Also, the four manipulating portions 46a correspond to the manipulating switches 42a to 42d, respectively, and characters such as A, B, C, and D indicating corresponding manipulating switches are printed on the surfaces of the manipulating portions 46a. In addition, the name sheet 46 has transparent portions 46b pervious the light from the light-emitting diodes 43a to 43d in the locations opposite to the insertion holes 34b, as well as transparent portions 46c which the indications on the name sheet 47 comes in sight through it from the front side.

Figure 1:
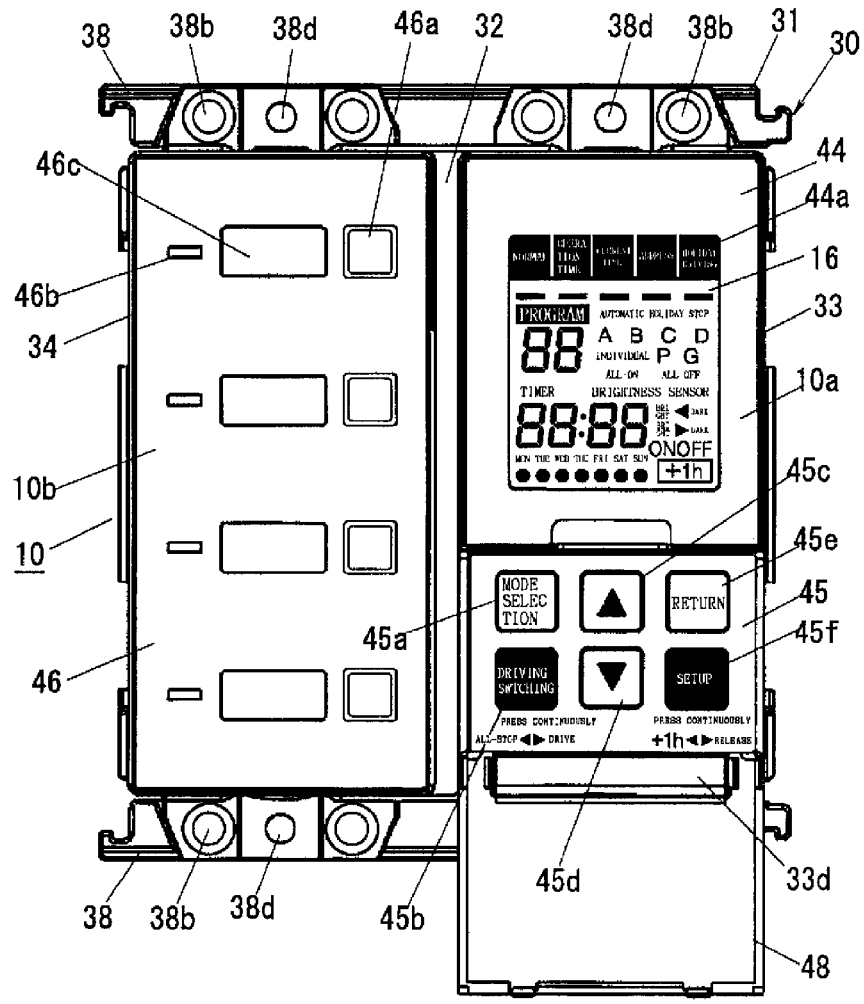
FIG. 1 is a front side view of a time switch according to an embodiment of the present invention.

Subsequently, operations of the time switch 10 will be described. First of all, operations of the setup unit 10a which sets up the time schedule will be described. Referring to FIG. 1, the manipulating buttons 45a to 45f of the switch group 41 are exposed when the door 48 of the decoration cover 33 is opened.

In the state of that, whenever the mode selection manipulating button (hereinafter, referred to as a mode selection key) 45a is pressed every, the operation mode of the signal processing unit 11 is shifted in the following cycle: a normal mode->an operation time setup mode->an address setup mode->a current time setup mode->a holiday driving setup mode->a normal mode . . . . Here, the normal mode is to carry out the schedule control set by using the switch group 41 or control operation according to the manipulation of the switch unit 10b, the operation time setup mode is to set up the time schedule to each address corresponding to each manipulating switch 42a to 42d, the address setup mode is to allocate an address to each manipulating switch 42a to 42d, the current time setup mode is to set up an hour, a minute, and a day of the week of the current time, and the holiday driving setup mode is to choice loads to be driven in particular days such as a national holiday (by pressing manipulating switches 42a to 42d corresponding to the loads in practical).

In case that the operation mode has been put in any one of various setup modes, a user can increase or decrease the setup values, or choose the setup item, by manipulating the manipulating buttons 45c and 45d (hereinafter, referred to as an UP-key 45c and a DOWN-key 45d). While increasing or decreasing the setup values, if the UP-key 45c or the Down-key is pressed for a long time, a fast-forward/backward function is executed. The setup items are established by the manipulating button 45f (hereinafter, referred to as a setup key). Further, it is possible to recover the previous setup item by pressing a recovery button (hereinafter, referred to as a recovery key) 45e.

Subsequently, setup items in each setup mode will be described. In the operation time setup mode, a user can choose a desired program number by manipulating the UP-key 45c and the DOWN-key 45d while seeing the program number display portion 16a of the LCD unit 16, and establish it by pressing the setup key 45f. Then, the user presses a manipulation portion 46a corresponding to any desired one of the manipulating switches 42a to 42d to set up a operation time, then establish it by pressing the setup key 45f, and then choose an operation manner (e.g., a timer control or a brightness sensor control) to be applied when the control item is implemented by manipulating the UP-key 45c and the DOWN-key 45d while seeing the operation manner display portion 16b. When the timer control is chose, a user can set the "hour" by manipulating the UP-key 45c and the DOWN-key 45d, and establish it by pressing the setup key 45f while seeing the time display portion 16c. Then, the user can set up and establish the "minute" through similar manipulations. On the other hand, when the brightness sensor control is chose, a user can choose a brightness direction (which is a changing direction of a detection signal from the brightness sensor 7 when the control item is implemented) by manipulating the UP-key 45c and the DOWN-key 45d while seeing the brightness direction display portion 16j, and establish it by pressing the setup key 45f. In this case, if the brightness direction has been chose as "bright<-dark", the control item is implemented when the brightness sensor 7 is changed from a dark condition to a bright condition, while if the brightness direction has been chose as "bright->dark", the control item is implemented when the brightness sensor 7 is changed from a bright condition to a dark condition. After a setup for the timer control or the brightness sensor control is completed, the user can choose the control item (ON or OFF) on the control time display portion 16k by manipulating the UP-key 45c and the DOWN-key 45d, and establish it by pressing the setup key 45f. Then, the user can choose any one of an activity and an inactivity for each day of the week by manipulating the UP-key 45c and the DOWN-key 45d while seeing the activity/inactivity state display portion 16e, and establish it by pressing the setup key 45f.

As a result of the above manipulation, a single program (time schedule) having sets of an addresses corresponding to the loads to be controlled, a control items and an operation manner (i.e., a control time in the timer control and a brightness direction in the brightness sensor control) for the loads is established for each day of the week, and the signal processing unit 11 stores the established time schedule in the program storage unit 13. Here, to continue setting up the time schedule, the user can return to a setup condition for the program number, then repeat similar manipulation. On the other hand, to terminate setting for the time schedule, the user can manipulate the mode selection key 45a in order that the current operation mode is switched to the normal mode. In addition, since the control manner can be individually set to each case of a control beginning and terminating, a user can apply any one of the control beginning and terminating to the timer control, and set the other to the brightness sensor control. Also, the user may apply both of the control beginning and terminating to the timer control and/or to the brightness sensor control.

Subsequently, the address setup mode will be described. In this mode, first of all, a user presses a manipulating portion 46a corresponding to any desired one of the manipulating switches 42a to 42d to set up an address, then establish it by pressing the setup key 45f, then chooses one of the functions (such as an individual control, a pattern control, a group control, an all-ON control, and an all-OFF control) by manipulating the UP-key 45c and the DOWN-key 45d while seeing the function display portion 16j, and then establishes it by pressing the setup key 45f. And then, the user choose an address number by manipulating the UP-key 45c and the DOWN-key 45d, and established it by pressing the setup key 45f, so that a function and the address number are set for the chose manipulating switch 42a to 42d. Here, to continue setting up an address, the user can return to a manipulation condition of choosing desired manipulating switches 42a to 42d, then repeat similar manipulation. If the mode selection key 45a is pressed, the address setup mode is terminated and is switched to the normal mode. To terminate the address setup mode, user can switch the current operation mode to the normal mode. When the address setup mode has been terminated, the established addresses are stored in the program storage unit 13 by the signal processing unit 11.

In addition, in the current time setup mode, a user can set the "hour" by manipulating the UP-key 45c and the DOWN-key 45d while seeing the time display portion 16c, and establish it by pressing the setup key 45f. Subsequently, the user can set the "minute" through similar manipulating then, set a day of the week by manipulating the UP-key 45c and the DOWN-key 45d while seeing the weekday display portion 16d, and then establish those by pressing the setup key 45f. Hereby, after setup for the current time is completed, the user can switch the current operation mode to the normal mode by pressing the mode selection key 45a. When the current time setup mode has been terminated, the timing operation is started from the time point set by the clock unit 11a of the signal processing unit 11.

In addition, in the holiday setup mode, when one or more loads have been chose by manipulating the manipulating portions 46a corresponding to the loads (i.e., the manipulating switches 42a to 42d) to be driven even on a holiday (i.e., the manipulation portion 46a functions as a setup switching means), light-emitting diodes 43a to 43d corresponding to the chosen loads are lighted up. Hereby, after the setup for all desired loads is completed, the user can switch the current operation mode to the normal mode by pressing the mode selection key 45a. Then, the addresses of the loads chosen in the holiday setup mode are stored in the program storage unit 13 by the signal processing unit 11.

In addition, when the setup key 45f is being continuously pressed for a predetermined time duration, the signal processing unit 11 starts to reflect the summer time rule to the time indication of the time display portion by counting the time an hour earlier from that of the clock unit 11a, and displays a character "+1h" on the summer time display portion 16m of the LCD unit 16. After the summer time rule is executed, the signal processing unit 11 performs the schedule control according to the summer time rule. In addition, when the setup key 45f is being continuously pressed for a predetermined time duration during the summer time rule is executed, the signal processing unit 11 returns the time indication of the time display portion to the original timing counted by the clock unit 11a as well as deletes the indication of the summer time on the summer time display portion 16m, so that the timing is escaped from the summer time. As described above, depending on the manipulation of the setup key 45f as the summer time switching switch, whether the summer time rule will be executed or escaped can be readily selected.

Subsequently, the operations of the normal mode will be described. In the normal mode, the driving mode of the signal processing unit 11 can be switched to one of an automatic driving mode, a holiday driving mode, and a stop mode through the driving switching key 45b (i.e., a driving switching means). In other words, whenever the driving switching key 45b is pressed every, the driving mode of the signal processing unit 11 is alternately switched to one of the automatic driving mode and the holiday driving mode. In addition, when the driving switching key 45b is being continuously pressed for the predetermined time duration, the driving mode of the signal processing unit 11 is switched to the stop mode. Then, when the driving switching key 45 is being continuously pressed again for the predetermined time duration, the original driving mode is returned.

In the automatic driving mode, the signal processing unit 11 implements the schedule that has been already registered in the program storage unit 13 for the loads corresponding to all the manipulating switches 42a to 42d. For example, if the schedule is set so that the lighting loads (e.g., a lighting system in a store) corresponding to the manipulating switches 42a are lit up at the start of an opening hour, the signal processing unit 11 transmits a transmission signal containing the address of the lighting load and the control item (e.g., a lighting-on control) from the signal transceiver unit 12 to the signal line Ls in order to light the corresponding lighting load when the current time counted by the clock unit 11a corresponds with a control beginning time (e.g., eight o'clock a.m.). Then, when the current time counted by the clock unit 11a corresponds with a control termination time (e.g., seven o'clock p.m.), the signal processing unit 11 transmits a transmission signal containing the address of the lighting load and the control item (e.g., a lights-out control) from the signal transceiver unit 12 to the signal line Ls in order to put out the corresponding lighting load.

In addition, if a load corresponding to any manipulating switch 42a is selected as an outdoor light or a signboard that should be turned on during the night, and if the time schedule is established such that the brightness sensor control is set as a control beginning operation manner, and the timer control is set as a control terminating operation manner, the signal processing unit 11 transmits a transmission signal containing the address of the lighting load and the control item (e.g., a lighting-up control) from the signal transceiver unit 12 to the signal line Ls according to the input signal from the brightness sensor receiver circuit 23 in order to light-up the corresponding lighting load when the brightness sensor detects that the brightness is changed from a bright condition to a dart condition. Then, when the current time counted by the clock unit 11a corresponds with the control termination time (e.g., twelve o'clock p.m.), the signal processing unit 11 transmits a transmission signal containing the address of the lighting load and the control item (e.g., a lights-out control) from the signal transceiver unit 12 to the signal line Ls in order to put out the corresponding lighting load.

In addition, if the time schedule is established such that the timer control is set as the control beginning operation manner, and the brightness sensor control is set as the control terminating operation manner, the signal processing unit 11 transmits a transmission signal containing the address of the lighting load and the control item (e.g., a light-up control) from the signal transceiver unit 12 to the signal line in order to light up the lighting load when the current time counted by the clock unit 11a corresponds with the control start time (e.g., seven o'clock p.m.). Then, when the brightness sensor 7 detects that the brightness is changed from a dark condition to a bright condition, the signal processing unit 11 transmits a transmission signal containing the address of the lighting load and the control item (i.e., a lights-out control) from the signal transceiver unit 12 to the signal line according to the input signal from the brightness sensor receiver circuit 23 in order to put out the corresponding lighting load.

In addition, if the time schedule is established such that the brightness sensor control is set as both the control beginning operation manner and the control terminating operation manner, the signal processing unit 11 transmits a transmission signal containing the address of the lighting load and the control item (e.g., a lighting-up control) from the signal transceiver unit 12 to the signal line according to the input signal from the brightness sensor receiver circuit 23 in order to light up the corresponding lighting load when the brightness sensor 7 detects that the brightness is changed from a bright condition to a dark condition. Then, when the brightness sensor 7 detects that the brightness is changed from a dark condition to a bright condition, the signal processing unit 11 transmits a transmission signal containing the address of the lighting load and the control item (e.g., a lights-out control) from the signal transceiver unit 12 to the signal line according to the input signal from the brightness sensor receiver circuit 23 in order to put out the corresponding lighting load.

As such, since any one of the timer control and the brightness sensor control can be chosen as a control manner to be performed when the control item is implemented, it is possible to choose an optimal control manner according to a control target load or an application.

Figure 7:
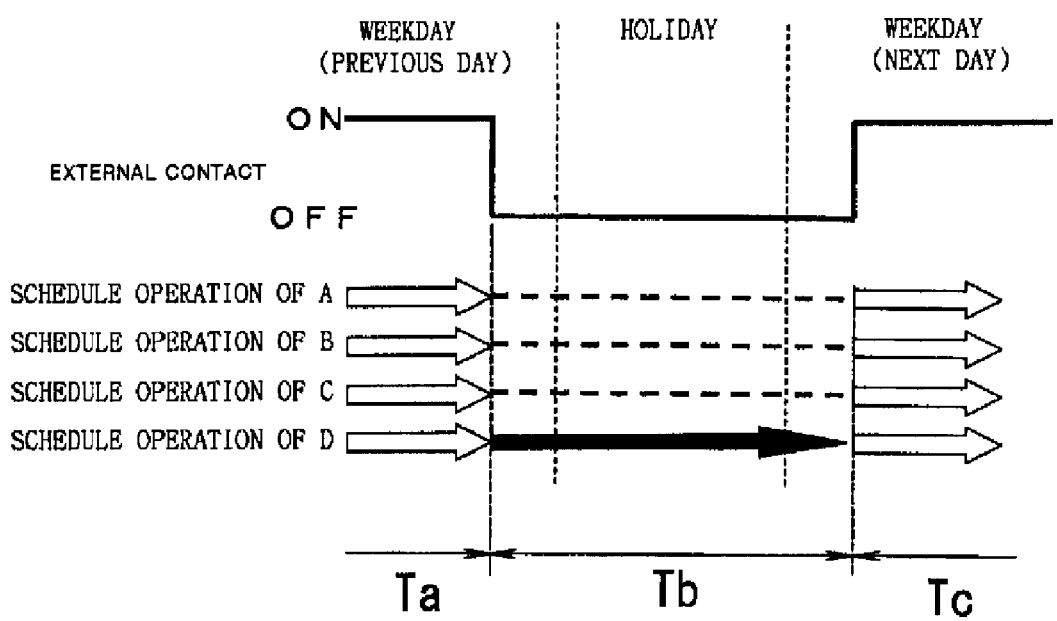
FIG. 7 is a timing chart illustrating operations of a time switch according to an embodiment of the present invention.

On the other hand, in the holiday driving mode, the signal processing unit 11 performs a schedule control according to the schedule stored in the program storage unit 13 for only the load set as the holiday setup mode. Although the driving mode of the signal processing unit 11 can be switched to a holiday driving mode by manipulating the driving switching key 45b, the present embodiment is provided with an external contact detecting circuit 24 to which a contact signal is input from the switch SW1 so that the driving mode of the signal processing unit 1 may be switched to the holiday driving mode according to the contact signal input from the external contact detection circuit 24. FIG. 7 is a timing chart illustrating a switching condition of a driving mode in a switch SW1. During periods Ta and Tc in which the switch SW1 is turned on (i.e., its contact is closed), the driving mode of the signal processing unit 11 is changed to the automatic driving mode, and the scheduled control is performed for all loads A to D corresponding to all switches 42a to 42d. In this case, assuming that the manipulating switches-corresponding to the loads A, B, and C are applied to indoor lights in an office, and the manipulating switch corresponding to the load D is applied to the outdoor lights, if the scheduled control may be performed such that the loads A, B, and C are turned off and only the load D is turned on during a holiday, during a period Tb (in a holiday driving mode) in which the contact condition of the switch SW1 is turned off (i.e., opened), the only load (e.g., D in the example of FIG. 7) selected in the holiday setup mode can be controlled using the timer control. In addition, the broken lines of FIG. 7 show a period in which the schedule operation is not performed.

In addition, in the stop mode, the signal processing unit 11 does not perform the scheduled control, but transmits a transmission signal containing the address of the corresponding load and the control item to the signal transceiver unit 12 to turn on or off the corresponding load only when the manipulation portion 46a corresponding to the manipulating switch 42a to 42d is pressed. In addition, even in the automatic driving mode or the holiday driving mode, the corresponding load can be forcibly turned on or off by pressing the manipulation portion 46a corresponding to the manipulating switch 42a to 42d.

Figure 8:
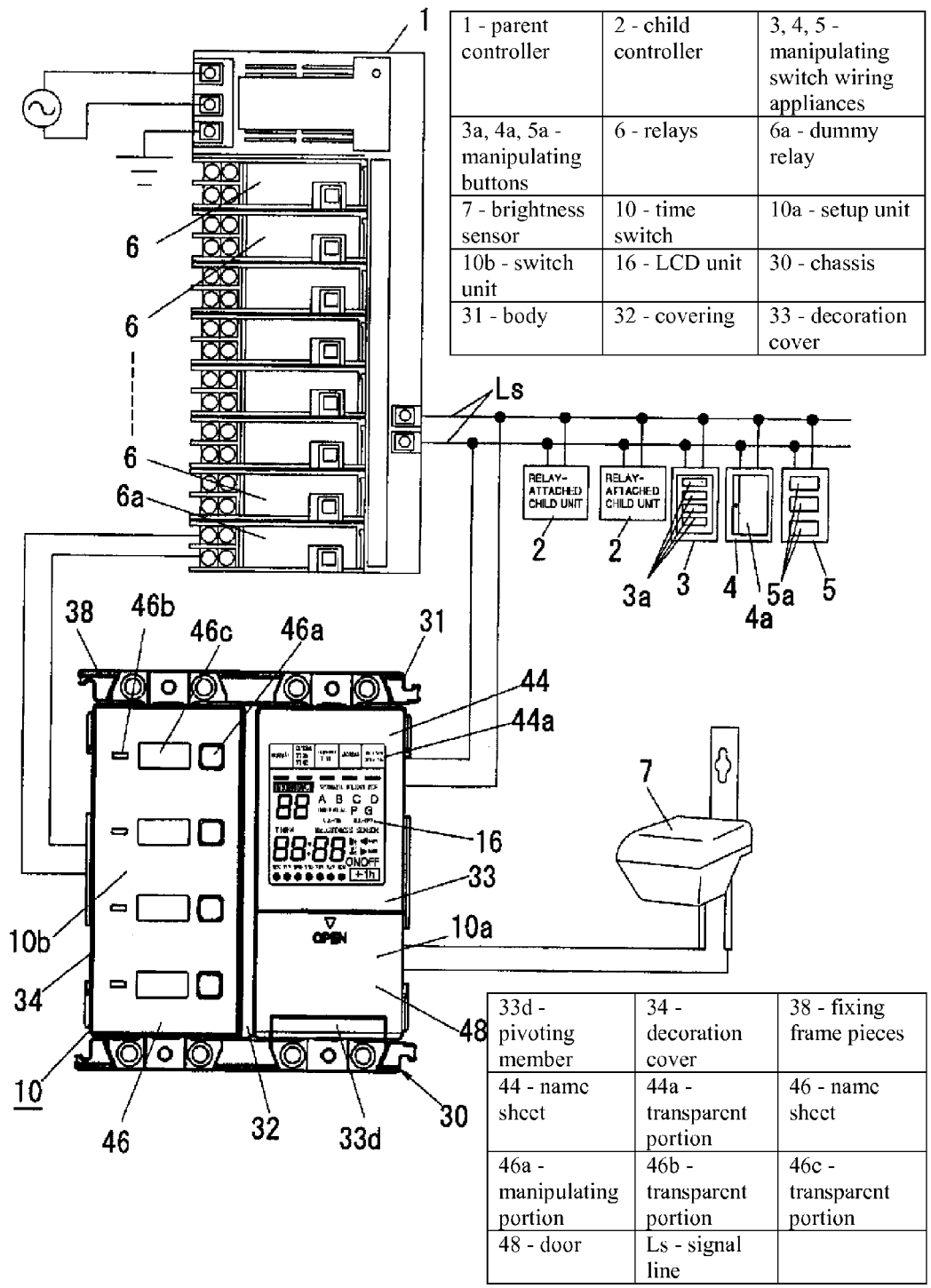
FIG. 8 is a constructional view illustrating another application of a time switch according to an embodiment of the present invention.

In this case, a dummy relay 6a which can be operated in interlocking with another relay 6 for operating another load may be connected as shown in FIG. 8, without connecting the switch SW1 to the external contact connection terminals T5 and T6. Also, the driving mode of the signal processing unit 11 may be switched to the automatic driving mode or the holiday driving mode in synchronization with the operation of turning on or off other loads. For example, if the dummy relay 6*a* is interlocked with a relay 6 which turns on or off the lights in the office, and if the signal processing unit 11 may switch the driving mode to the automatic driving mode on the basis of the detection result of the external contact detection circuit 24 when the lights in the office are turned on, the driving mode of the signal processing unit 11 is switched to the automatic driving mode in order that the control is performed according to a basic schedule when the lights in the office are turned on by manipulating a wall switch of the office in every morning of weekdays. Also, the driving mode of the signal processing unit 11 is switched to the holiday driving mode when the lights in the office are turned off on a holiday or in the night, so that only the loads set in the holiday driving mode can be controlled according to the schedule. In addition, if the dummy relay 6*a* is interlocked with an electric lock system, the dummy relay 6 may be turned in interlocking with the electric lock system on when the electric lock system has been unlocked to work, so that the driving mode of the signal processing unit 11 may be switched to the automatic driving mode according to the detection result of the external contact detection circuit 24 as well as the dummy relay 6 may be turned off in interlocking with the electric lock system when the electric lock system has been locked after work, so that the driving mode may be switched to the holiday driving mode according to the detection result of the external contact detection circuit 24. Like this, if the driving mode is switched to the holiday driving mode according to the contact signal of the dummy relay 6, the driving mode can be automatically switched according to the operation of other loads without intentionally performing manipulation of switching to the automatic driving mode or the holiday driving mode. Thus, it is possible to avoid a risk of forgetting the manipulation of switching the driving mode.

Also, in the stop mode, the signal processing unit 11 transmits a transmission signal containing the address of the corresponding load and the control item from the signal transceiver unit 12 to turn on or off the corresponding load without performing the scheduled control when the manipulation portions 46*a* corresponding to the manipulating switches 42*a* to 42*d* are pressed.

As described above, the time switch 10 according to the present embodiment has manipulating switches 42*a* to 42*d* for manipulating the control target loads for a scheduled control, so that the loads can be manually turned on or off using the manipulating switches 42*a* to 42*d*. Moreover, since the addresses registered on the program storage unit 13 are allocated to the manipulating switches 42*a* to 42*d*, the addresses of the manipulating switches 42*a* to 42*d* can be set using the switch group 41. Therefore, it is unnecessary to prepare an exclusive use address setup means. Also, since the schedule set by the switch group 41 is established for the loads controlled by the manipulating switches 42*a* to 42*d*, an operator who performs a setup operation can readily understand the control items to be set. Therefore, it is possible to simplify the schedule setup operation.

In addition, if the addresses to which the timer control should be performed in the holiday driving mode are set using the switch group 41, it is possible to perform a timer control for part of the loads just by manipulating the driving switching key 45*b* when part of the loads are to be operated on a holiday or a rest day.

In addition, it is possible to switch the operation mode to one of the automatic driving mode or the special day driving mode by using the external contact signal input to the external contact connection terminals T5 and T6. For example, if the contact signal of a relay which operates with the load control relays for turning on or off the lighting loads of the office is used as the external contact signal, it is possible to switch the operation mode to the automatic driving mode by the contact signal simultaneously input when the lighting loads in an establishment is lit to work on every weekday, switch the operation mode to the special day driving mode on a holiday or in the night because the lighting loads in the establishment are not turned off, and achieve a control mode switching without intentionally performing manipulation of switching the control mode.

According to the invention of claim 1, since the chassis of the time switch is implanted in a wall surface with its front side being exposed, and the setup manipulation unit is arranged in the front surface of the chassis, there is an effect of allowing a user to readily set up or change the time schedule even after the time switch was installed.

According to the invention of claim 2, it is possible to manually turn on or off the load using the manipulating switch. Moreover, since the address registered in the program storage unit is allocated to the manipulating switch, it is possible to set up the address of the manipulating switch using the setup manipulation unit without necessary of a dedicated address setup means. Furthermore, since the schedule set by the setup manipulation unit is set for the load to be controlled by the manipulating switch, there is an effect of allowing an operator who performs the setup operation to easily understand the control item to be set and simplify the schedule setup operation.

According to the invention of claim 3, if the address to which the timer control is to be performed in a special day driving mode is set using the setup switching means, it is possible to perform the timer control for only a part of the loads by just switching to the special day driving mode using the driving switching means when only a part of the loads are to be operated on a holiday or a rest day.

According to the invention of claim 4, the driving mode can be switched to one of the automatic driving mode and the special day driving mode depending on the contact signal input to the external contact connection terminal. For example, if a contact signal of a relay operated in interlocking with relays turning on or off lighting loads in an establishment is used as the contact signal, it is possible to switch the driving mode of the time switch to the automatic driving mode by the contact signal input in interlocking with when the lighting loads in the establishment are lit by user to work, then the schedule control for all loads is performed. On the other hand, during a holiday or in the night, since the lighting loads in the office are not turned on, the driving mode of the time switch can be switched to the special day driving mode without necessity of an exclusive use switch for switching the driving mode, and thus it is possible to allow a user to switch the driving mode without intentionally performing the manipulation for switching the driving mode.

According to the invention of claim 5, if a changing direction of output signal from the brightness sensor is set instead of the control time for implementing the corresponding control item, it is possible to implement the corresponding control item when the brightness sensor detects that an ambient brightness is changed from a bright condition to a dark condition or from a dark condition to a bright condition. Moreover, if a brightness sensor has been connected to the brightness sensor connection terminals, since power is supplied to the brightness sensor as well as an output signal change of the brightness sensor can be detected from the voltage changing between the terminals, there is no necessary of a wiring for inputting the signal separately from the wiring for supplying power, therefore there is an effect of readily installing a wiring construction.

According to the invention of claim 6, there is an effect of readily choosing entering into the summer time rule or recovery from the summer time rule using a summer time conversion switch.

What is claimed is:

1. A time switch used in a remote monitoring control system in which a manipulating switch wiring appliance for monitoring switch manipulation of manipulating switches, to which individual addresses are allocated, and a remote control wiring appliance for controlling opening or closing of relays, to which individual addresses are allocated, are connected to a signal line, the manipulating switch wiring appliance outputting a transmission signal containing a monitoring input and address information from the manipulating switch to the signal line using a time division multiplexing transmission scheme, and the remote control wiring appliance opening or closing the relays on the basis of the monitoring input of the transmission signal when the address information contained in the transmission signal received through the signal line corresponds with an address of the corresponding relay, in order to turn on or off a load connected to the relay, the time switch comprising:

a program storage unit which stores sets of addresses corresponding to the loads to be controlled, control items, and control times of the loads as a time schedule;
   a setup manipulation unit which sets up the addresses, the control items, and the control times and stores those in the program storage unit as the time schedule;
   a clock unit which counts a current time;
   a signal transceiver unit which transmits and receives the transmission signal through the signal line by using a time division multiplexing transmission scheme; and
   a signal processing unit which prepares the transmission signal containing the addresses and the control items in the time schedule as the address information and the monitoring input and transmits the transmission signal from the signal transceiver unit to the signal line when the control time contained in each set of the time schedule stored in the program storage unit corresponds with the current time counted by the clock unit,
   wherein the program storage unit, the clock unit, the signal transceiver unit, and the signal processing unit are situated in a switch chassis implanted in a wall surface with its front surface being exposed, and the setup manipulation unit is arranged in the front surface of the switch chassis, and
   wherein the manipulating switches, to which the addresses registered in the program storage unit are allocated, arranged in the front surface of the switch chassis, and the signal processing unit prepares the transmission signal containing the control item for reversing the turning on or off operation of the corresponding load as the monitoring input by using the address allocated to a switch as the address information and transmits the transmission signal from the signal transceiver unit to the signal line when the manipulating switches are manipulated.

2. The time switch according to claim 1, further comprising a driving switching means for switching a driving mode of the signal processing unit to an automatic driving mode in which a timer control according to the time schedule is applied to all of the addresses registered in the program storage unit or a special day driving mode in which a timer control according to the time schedule is applied to only a selected address, and a setup switching means for switching whether or not the timer control according to the time schedule should be applied to each address in the special day driving mode.

3. The time switch according to claim 2, further comprising an external contact connection terminal to which a contact signal for switching the driving mode of the signal processing unit to one of the automatic driving mode and the special day driving mode is input, wherein the signal processing unit switches the driving mode to the automatic driving mode or the special day driving mode on the basis of the contact signal input through the external contact connection terminal.

4. The time switch according to claim 1, further comprising a brightness sensor connection terminal to which a brightness sensor having an output signal which changes according to an ambient brightness and a predetermined brightness reference value is connected, wherein the brightness sensor is supplied with power through the brightness sensor connection terminal and changes a voltage between terminals according to the change of the output signal, and the program storage unit stores at least a time schedule in which a changing direction of the output signal of the brightness sensor is set instead of the control time for applying the corresponding control item.

5. The time switch according to claim 1, further comprising a summer time conversion switch for selection between a summer time condition in which a current time of the clock unit is counted a predetermined time earlier and an original condition in which the current time of the clock unit is originally counted.

6. The time switch according to claim 2, further comprising a brightness sensor connection terminal to which a brightness sensor having an output signal which changes according to an ambient brightness and a predetermined brightness reference value is connected, wherein the brightness sensor is supplied with power through the brightness sensor connection terminal and changes a voltage between terminals according to the change of the output signal, and the program storage unit stores at least a time schedule in which a changing direction of the output signal of the brightness sensor is set instead of the control time for applying the corresponding control item.

7. The time switch according to claim 3, further comprising a brightness sensor connection terminal to which a brightness sensor having an output signal which changes according to an ambient brightness and a predetermined brightness reference value is connected, wherein the brightness sensor is supplied with power through the brightness sensor connection terminal and changes a voltage between terminals according to the change of the output signal, and the program storage unit stores at least a time schedule in which a changing direction of the output signal of the brightness sensor is set instead of the control time for applying the corresponding control item.

8. The time switch according to claim 2, further comprising a summer time conversion switch for selection between a summer time condition in which a current time of the clock unit is counted a predetermined time earlier and an original condition in which the current time of the clock unit is originally counted.

9. The time switch according to claim 3, further comprising a summer time conversion switch for selection between a summer time condition in which a current time of the clock unit is counted a predetermined time earlier and an original condition in which the current time of the clock unit is originally counted.

10. The time switch according to claim 4, further comprising a summer time conversion switch for selection between a summer time condition in which a current time of the clock unit is counted a predetermined time earlier and an original condition in which the current time of the clock unit is originally counted.

11. A time switch used in a remote monitoring control system, the time switch comprising:

a program storage unit which stores sets of addresses corresponding to loads to be controlled, control items, and control times of the loads as a time schedule;

a setup manipulation unit which sets up the addresses, the control items, and the control times and stores those in the program storage unit as the time schedule;

a clock unit which counts a current time;

a signal transceiver unit which transmits and receives a transmission signal through a signal line using a time division multiplexing transmission scheme; and a signal processing unit which prepares the transmission signal containing the addresses and the control items in the time schedule as address information and a monitoring input and transmits the transmission signal from the signal transceiver unit to the signal line when the control time in the time schedule stored in the program storage unit corresponds with the current time counted by the clock unit, wherein the program storage unit, the clock unit, the signal transceiver unit, and the signal processing unit are situated in a switch chassis implanted in a wall surface with a front surface of the switch chassis being exposed, and the setup manipulation unit is arranged in the front surface of the switch chassis, and wherein manipulating switches, to which the addresses registered in the program storage unit are allocated, arranged in the front surface of the switch chassis, and the signal processing unit prepares the transmission signal containing the control item for reversing the turning on or off operation of the corresponding load as the monitoring input by using the address allocated to a switch as the address information and transmits the transmission signal from the signal transceiver unit to the signal line when the manipulating switches are manipulated.

* * * * *